United States Patent [19]

Shono et al.

[11] 4,215,593

[45] Aug. 5, 1980

[54] TRANSFER CASE FOR AUTOMOTIVE VEHICLES

[75] Inventors: Kinji Shono, Chofu; Kunihiko Suzuki, Fujisawa, both of Japan

[73] Assignee: Nissan Motor Company, Limited, Yokohama, Japan

[21] Appl. No.: 843,437

[22] Filed: Oct. 18, 1977

[30] Foreign Application Priority Data

Oct. 25, 1976 [JP] Japan .............................. 51-127382

[51] Int. Cl.² .......................................... F16H 37/06
[52] U.S. Cl. .................................. 74/665 D; 74/15.4; 74/674; 74/754
[58] Field of Search ................. 74/753, 754, 768, 769, 74/665 F, 665 S, 665 T, 665 GA, 665 GC, 665 GD, 665 GE, 750 R, 674, 52, 15.4, 15.66

[56] References Cited

U.S. PATENT DOCUMENTS

| | | | |
|---|---|---|---|
| 2,107,072 | 2/1938 | Herrington | 74/665 GA |
| 2,672,056 | 3/1954 | Stone | 74/15.4 |
| 2,853,890 | 9/1958 | Kelbel | 74/665 GA |
| 3,046,813 | 7/1962 | Bixby | 74/15.66 X |
| 3,548,680 | 6/1969 | Crook | 74/674 X |
| 3,993,152 | 11/1976 | Fogelberg | 74/665 D X |
| 3,999,447 | 12/1976 | Halberg | 74/701 |
| 4,040,309 | 8/1977 | Wood et al. | 74/665 T |

*Primary Examiner*—Samuel Scott
*Assistant Examiner*—Randall L. Green

[57] ABSTRACT

The invention concerns a transfer case having an input shaft and two output shafts. The transfer case comprises a planetary gear set operatively connected between the input shaft and the two output shafts. With a manipulation of a single shift lever operatively connected to a slide member, the transfer case can be shifted into one of the following three conditions, first condition in which input rotation speed on the input shaft is transmitted to both output shafts at a reduced rotation speed without any differential action between these output shafts; second condition in which the same rotation speed as that on the input shaft is transmitted to both output shafts without any differential action; and third condition in which the same rotation speed as that on the input shaft is transmitted to both output shafts with a differential action between the output shafts.

25 Claims, 16 Drawing Figures

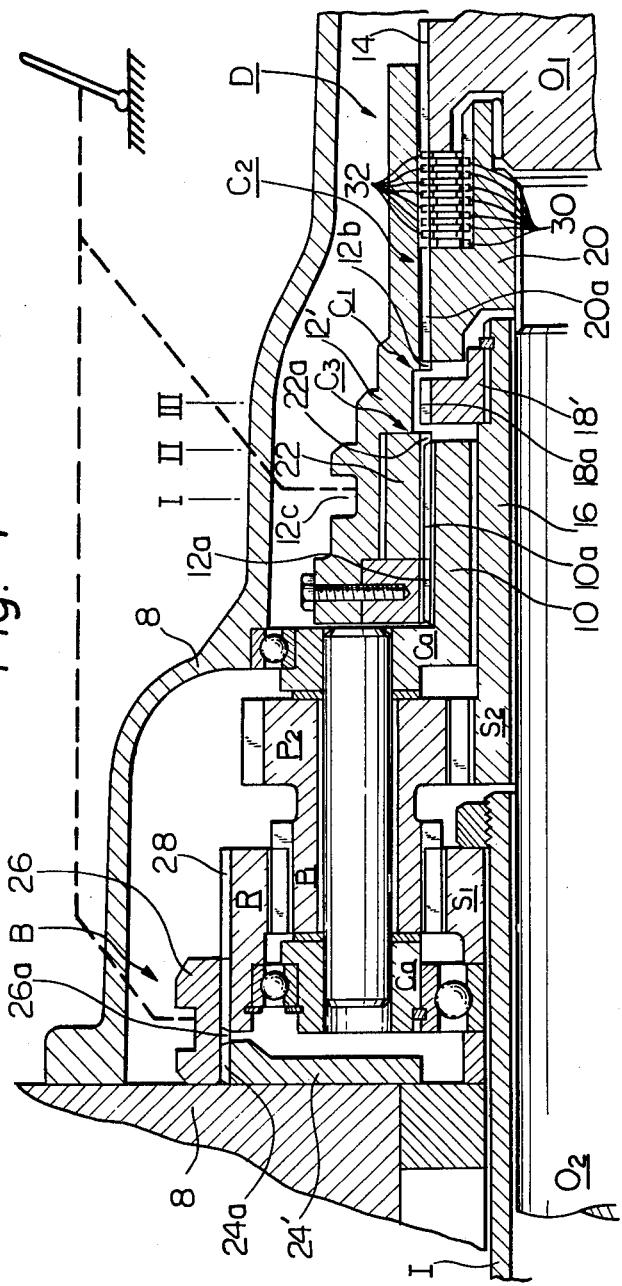

TRANSFER CASE FOR AUTOMOTIVE VEHICLES

BACKGROUND OF THE INVENTION

The present invention relates to transfer cases for automotive vehicles having a plurality of pairs of traction axles. More particularly, the invention relates to a transfer case having an input shaft driven by a prime mover of an automotive vehicle through a main transmission and a plurality of output shafts operatively connected to a plurality of pairs of traction axles, respectively, to drive them.

A four-wheel drive automotive vehicle having such a drive power path as above presents the following problems when it is driven through a paved road with a four-wheel drive.

(1) On cornering (i.e., turning), the front wheels tend to slide, causing a great deal of effort, on the part of a driver, for manipulating a steering wheel and a great deal of front tire wear, because the front wheels must overrun the rear wheels to run through a curve having radius of curvature longer than a curve which the rear wheels run through.

(2) In the case that there are variations in effective tire diameters due to tire overinflation and/or tire wear and/or imbalance of load on the vehicle body, such wheel or wheels having a smaller diameter will act as a brake, making it difficult to keep the vehicle moving in a straight line.

(3) The braking phenomenon as described above will also impose severe stress on the instruments between the engine and the traction wheels.

To eliminate these problems, it is proposed to provide, in addition to a front differential mechanism between front wheels and a rear differential mechanism between rear wheels, a third differential mechanism between the front and rear differential mechanisms to permit the front wheels to outrun the rear wheels on cornering and those wheels which have relatively small effective diameter to outrun the remaining wheels.

Since it is not desirable to permit differential action between the front wheels and the rear wheels if one or some wheels slip when the vehicle is driven through rough terrain, such as sand, mud or snow, the third differential mechanism must be provided with a mechanism to limit its differential action for facilitating moving the vehicle through or out of sand, mud or snow. Since, under some circumstances, limitation in some degree of the differential action is not sufficient for facilitating extraction of the vehicle if logged in sand, mud or snow, a lock-up mechanism must be installed to prevent the differential action of the third differential mechanism.

Besides, it is necessary to install, in addition to a main transmission for high-speed low torque driving through a paved road, an auxiliary transmission for lowspeed high-torque off-road driving, because excessively high load would be imposed to the engine if the vehicle is driven at low-speed high-torque with the main transmission.

It will now be understood that for off-road driving without imparing on-road driving, a third differential between the front and rear axles with a lock-up mechanism and another transmission for off-road driving in addition to a main transmission for on-road driving need to be installed in a vehicle.

SUMMARY OF THE INVENTION

The present invention relates on automotive vehicles in which a transfer case serves as such a third differential and an auxiliary transmission as demanded.

It is object of the present invention to provide a transfer case utilizing a planetary gear set to provide advantage of being simple in construction and being compact and light in weight.

It is another object of the present invention to provide a transfer case in which shifting into and out of driving with a differential action between a plurality of output shafts of the transfer case, and shifting between high-speed low torque driving and lowspeed high torque driving can be done easily and relatively effortlessly with a single lever. According to the transfer case of the invention these shifting can be done by selectively operation of two clutches and one brake.

BRIEF DESCRIPTION OF THE DRAWINGS

FIG. 4 is a longitudinal section of the upper half of a second embodiment of a transfer case in accordance with the invention;

DESCRIPTION OF THE PREFERRED EMBODIMENTS

Figure 1A:
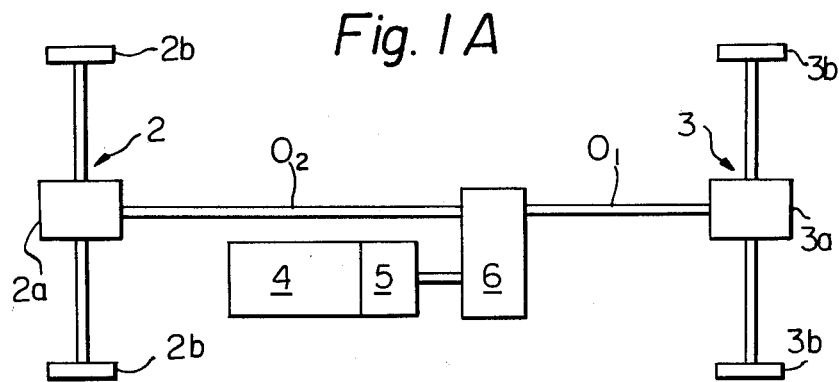
FIG. 1A is a plan view of a portion of an automobile exemplifying a preferred arrangement of components including the transfer case of the present invention.

Referring first to FIG. 1A, a portion of an automobile includes a front axle assembly 2 having a front differential unit 2a and a pair of front wheels 2b, and a rear axle assembly 3 having a rear differential unit 3a and a pair of rear wheels 3b. The rear wheels 3b are driven by a prime mover, such as an internal combustion engine 4 via a power train through a transmission 5, a transfer case 6, a first output shaft $O_1$ and the rear differential unit 3a. The front wheels 2b are driven via a power train through the transmission 5, the transfer case 6, a second output shaft $O_2$ and the front differential unit 2a.

Figure 1:
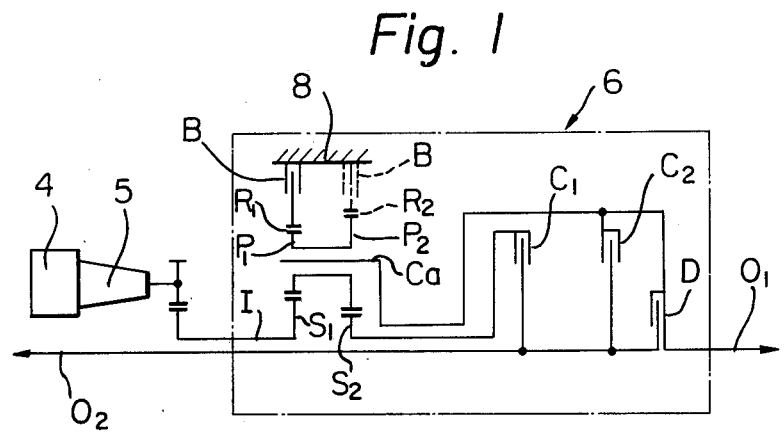
FIG. 1 is a schematic illustration of a first embodiment of a transfer case in accordance with the present invention.
Figure 3:
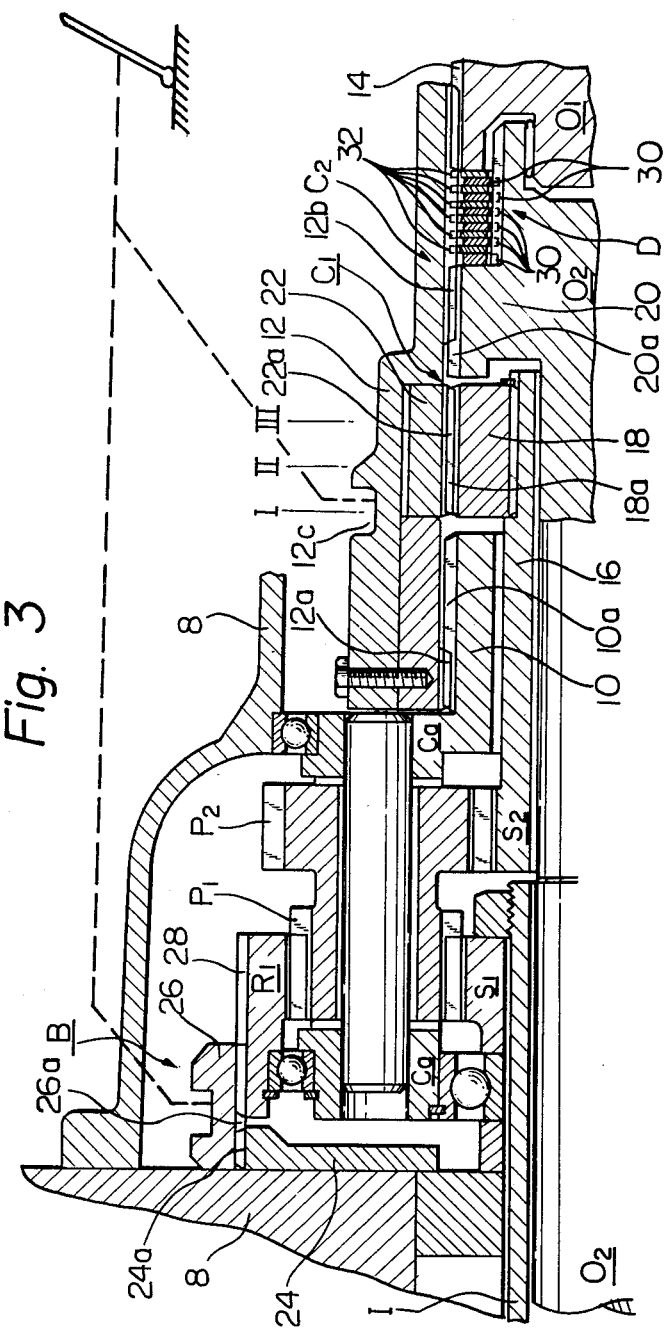
FIG. 3 is a longitudinal section of the upper half of the transfer case of FIG. 1 in its practical form.

Referring now to FIGS. 1 and 3, a transfer case is generally designated by the numerals 6 and includes a housing 8. A hollow input shaft I is rotatably supported by the housing 8 and is received within the transfer case 6. The input shaft I extends therefrom to receive torque from the transmission 5.

The transfer case 6 comprises a planetary gear set which includes a first element in the form of a first sun gear $S_1$ splined to the input shaft I, a second element in the form of a carrier $C_a$ rotatably carrying a small diameter pinion $P_1$ meshing with the first gear $S_1$ and an integral large diameter pinion $P_2$, a third element in the form of a second sun gear $S_2$ meshing with the large diameter pinion $P_2$, and a fourth element in the form of a ring gear $R_1$ meshing with the small diameter pinion $P_1$. The fourth element may take the form of a ring gear $R_2$ meshing with the large diameter pinion $P_2$, if desired. The carrier $C_a$ and the sun gear $S_2$ are connectable to the first and second output shafts $O_1$ and $O_2$, respectively. A first clutch $C_1$, when engaged, connects the sun gear $S_2$ with the second output shaft $O_2$ to complete a drive connection therebetween and breakes such drive connection when released. A second clutch $C_2$, when engaged, connects the first output shaft $O_1$ with the second output shaft $O_2$ to complete a drive connection therebetween and breakes such drive connection when released.

A brake B, when applied, connects the ring gear $R_1$ or alternatively the ring gear $R_2$ with the housing 8. A lock-up mechanism, in the form of a clutch D, is provided to limit differential action between the two output shafts $O_1$ and $O_2$. The lock-up clutch D, when engaged, limits differential action between the two output shafts $O_1$ and $O_2$.

Referring now to the details of the transfer case shown in FIG. 3, the carrier $C_a$ has an annular extension 10. A first slide member 12 is always splined to the annular extension 10, with its internal splined section 12a engaged by an external splined section 10a formed on the annular extension 10, and also to the output shaft $O_1$, with its another internal splined section 12b engaged by an external splined section 14 formed on the output shaft $O_1$. As a result, a permanent drive connection between the carrier Ca and the output shaft $O_1$ is completed.

The sun gear $S_2$ has a sleeve portion 16 rotatably received with the annular extension 10. The sleeve section 16 extends from the annular extension 10 rearwardly and has, at its rearward terminal end portion, a ring member 18 splined thereto. The second output shaft $O_2$ is in an axial alignment with the first output shaft $O_1$ and is rotatably received within the hollow input shaft I, sun gear $S_2$ and sleeve section 16. The second output shaft $O_2$ extends from the sleeve section 16 rearwardly to have a radially extending hub section 20. The hub section 20 is positioned between the sleeve section 16 and the first output shaft $O_1$. An idle spline 22 is rotatably supported, in axial fit, by the slide member 12 and is always splined to the ring member 18 with its internal splined section 22a engaged by an external splined section 18a of the ring member 18. The internal splined section 22a of the idle spline 22 is selectively engaged by an external splined section 20a of the hub section 20 to complete a drive connection between the sun gear $S_2$ and the second output shaft $O_2$. It will be understood that the internal splined section 22a, external splined section 18a, and external splined section 20a from the clutch $C_1$ (see FIG. 1).

The internal splined section 12b, which is always engaged by the external splined section 14 of the first output shaft $O_1$, is engaged by the external splined section 20a of the hub section 20. The internal splined section 12b is selectively disengaged from the external splined section 20a. It will be understood that the internal splined section 12b, external splined section 14 and external splined section 20a form the second clutch $C_2$ (see FIG. 1).

When the slide member 12 is in the illustrated position of FIG. 3, in which a cutout 12c formed on the slide member 12 aligns with a position denoted by I (I-position), the internal splined section 12b is engaged not only by the external splined section 14 but also by the external splined section 20a. In this condition, therefore, clutch $C_1$ is released and clutch $C_2$ is engaged.

When the slide member 12 is moved rightwardly (viewing in FIG. 3) and takes a second position, in which the cutout 12c aligns with a position denoted by II (II-position), the internal splined section 12b remains engaged by the external splined sections 14 and 20a and, in addition thereto, the internal splined section 22a of the idle spline 22 is engaged not only by the external splined section 18a but also by the external splined section 20a. In this condition, therefore, both clutches $C_1$ and $C_2$ are engaged.

When the slide member 12 is moved further rightwardly (viewing in FIG. 3) and takes a third position, in which the cutout 12i c aligns with a position denoted by III (III-position), the internal splined section 12 is disengaged from the external splined section 20a, while the internal splined section 22a remains engaged both by the external splined sections 18a and 20a. In this condition, therefore, the clutch $C_1$ is engaged and clutch $C_2$ released.

A clutch plate 24 which is formed with an external splined section 24a is rigidly secured to the housing 8. A second slide member 26 has an internal splined section 26a always engaged by an external splined section 28a formed on the ring gear $R_1$. The internal splined section 26a is selectively engaged by an external splined section 24a of the clutch plate 24. It will be understood that the external splined section 24a, internal splined section 26a and external splined section 28 form the brake B (see FIG. 1). Although not shown, the second slide member 26 cooperates with the first slide member 12 such that when the first slide member 12 is in the I-position, the second slide member 26 is in a position in which the internal splined section 26a engaged by external splined sections 24a and 28 thereby to prevent rotation of the ring gear $R_1$, whereas, when the first slide member 12 is in either one of II-position and III-position, the second slide member 26 is in a position in which the internal splined section 26a is disengaged from the external splined section 24a thereby to allow rotation of the ring gear $R_1$.

The first slide member 12 is moved by a manually operative lever (shown in phantom in FIG. 3) to assume one of the three positions, that is, I-position, II-position and III-position. Thus manipulating the lever will shift the transfer case into a desired one of the following three conditions effortlessly.

When first slide member 12 is in I-position

Figure 2:
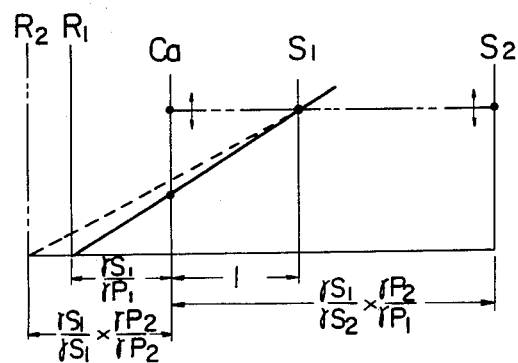
FIG. 2 is a diagram showing the different speeds of the different rotary elements of the planetary gear train of the transfer case of FIG. 1.

In this condition, the clutch $C_1$ is released, the clutch $C_2$ engaged and the brake B applied, so that the ring gear $R_1$ ($R_2$), carrier Ca and sun gear $S_1$ are coactive. Assuming that the radius of ring gear $R_1$ ($R_2$) is $rR_1$ ($rR_2$), the radius of sun gear $S_1$ is $rS_1$, rotation speeds of the above mentioned three rotary elements can be visualized as shown in FIG. 2. Assuming that rotation speed of input shaft I is $wS_1$ and rotation speed of carrier Ca is wCa, then $wCa=(rS_1/rR_1+rS_1)wS_1$, if ring gear $R_1$ is used, or $wCa=rS_1/rR_2+rS_1 wS_1$, if ring gear $R_2$ is used.

This reduced rotation speed is delivered to both output shafts $O_1$ and $O_2$. In FIG. 2, solid line shows different speeds of three different rotary elements $S_1$, Ca and $R_1$ if ring gear $R_1$ is used, while a dashed line shows different speeds of three different rotary elements $S_1$, Ca and $R_2$ if ring gear $R_2$ is used. In this condition, no differential action between the two output shafts $O_1$ and $O_2$ occurs because clutch $C_2$ is engaged. Ratio (i) of $wS_1$ to wCa is now lower than 1 (i>1).

When first slide member is in II position

In this position clutches C1 and C2 are engaged and the brake B is released. Thus with the clutches C1 and C2 engaged no relative movement between the first and second sun gears S1 and S2 and carrier Ca is permitted and therefore rotate together. Since the second clutch C2 is engaged the output shafts 01 and 02 rotate simultaneously to transmit the rotation of the input shaft without modification. In short, a lock up state occurs wherein the gear ratio is equal to 1.

In this condition, clutch $C_1$ is engaged, clutch $C_2$ released and brake B released, so that carrier Ca, sun gear $S_1$ and sun gear $S_2$ are coactive. Assuming that radii sun gear $S_1$, sun gear $S_2$, pinion $P_1$ and pinion $P_2$ are $\gamma S_1$, $\gamma S_2$, $\gamma P_1$ and $\gamma P_2$, respectively, rotation speeds of three different rotary elements Ca, $S_1$ and $S_2$ can be shown by phantom line shown in FIG. 2. Input torque on input shaft I, therefore, is split into two output shafts $O_1$ and $O_2$ through carrier Ca and sun gear $S_2$. Then, front wheels 2b are allowed to outrun rear wheels 3b when the automotive vehicle is cornering. It will be understood that when the automotive vehicle is driven with the first slide member 12 in the III-position, tire wear, which would otherwise be noticeable, when the vehicle is driven on a paved road can be eliminated. In this condition as explained above there occurs differential action between output shafts $O_1$ and $O_2$, and the ratio i is 1 (i=1).

Torque split ratio (when the first slide member 12 is in the III-position) Tc (torque on carrier Ca): $T_{S2}$ (torque on sun gear $S_2$) is $(rS_1 \cdot rP_2/rS_2 \cdot rP_1=1):1$. This is determined from the diagram shown in FIG. 2. Hence, $Tc=T_{S2} (rS_1 \cdot rP_2/rS_2 \cdot rP_1-1)$. SInce Tc and $T_{S2}$ decreases as a friction coefficient (with respect to a road) decreases, thus if the friction coefficient becomes zero, Tc and $T_{S2}$ will also become zero and no traction force will develop. In order to eliminate this shortcoming when the first slide member 12 is in the III-position, a differential action limiting mechanism in the form of a friction clutch D (see FIGS. 1 and 3) may be provided, if desired, which when engaged frictionally interconnects output shafts $O_1$ and $O_2$ thus preventing Tc and $T_{S2}$ from reducing excessively. The clutch D, as best seen in FIG. 3, comprises a plurality of friction plates 30 splined to the hub section 20 of outputs shaft $O_2$ and interleaved friction plates 32 splined to the first slide member 12.

The clutch D is not essential and can be removed, because it is only necessary to move the first slide member 12 to II-position or I-position for a four-wheel enforced drive if the friction coefficient drops when the automotive vehicle is driven with the first slide member 12 in the III-position.

Figure 5A:
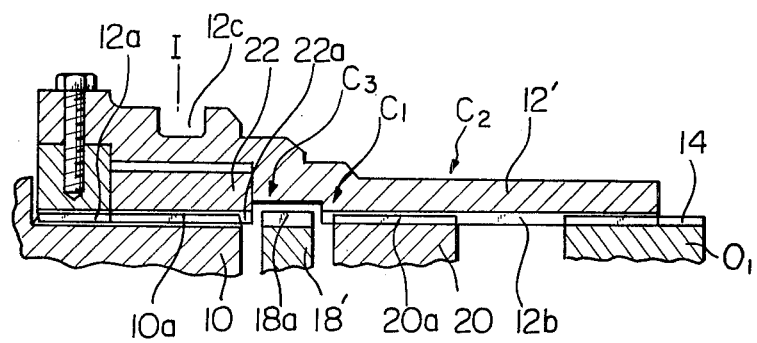
FIGS. 5A to 5C are fragmentary section of the transfer case of FIG. 4 showing different positions of a idle spline.
Figure 5B:
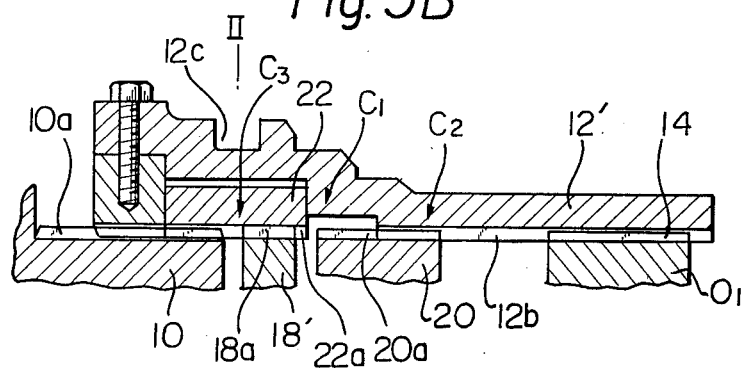
Figure 5C:
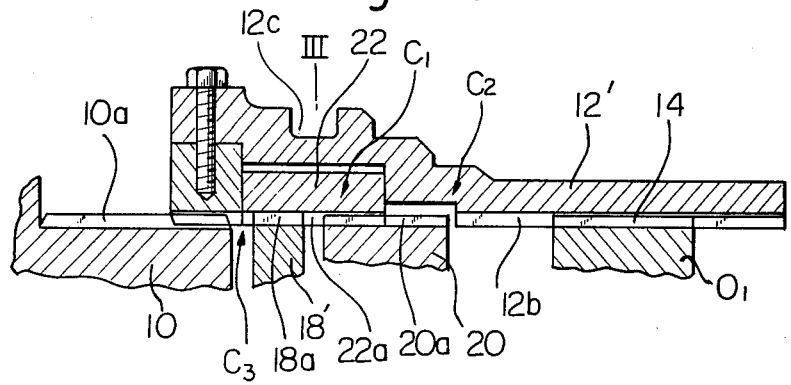

Referring to FIGS. 4 to 5C, a second embodiment of a transfer case according to the present invention is illustrated which is devised to shorten axial or longitudinal length of a transfer case.

A first clutch $C_1$ in this embodiment includes an internal splined section 22a of an idle spline 22, an external splined section 18a of a ring member 18' of a second sun gear $S_2$ and an external splined section 20a of a hub section 20 of a second output shaft $O_2$. The axial length and arrangement of these splined sections 22a, 18a and 20a are such that when a first slide member 12' is in I-position or II-position (see FIGS. 5A and 5B), the internal splined section 22a is not engaged by the external splined section 20a and thus clutch $C_1$ is released, whereas, when the slide member 12' is in III-position (see FIG. 5C), the internal splined section 22a is engaged by external splined section 18a and external splined section 20a and thus clutch $C_1$ is engaged.

Since, in this embodiment, clutch $C_1$ is released when the slide member 12' is in II-position, a third clutch $C_3$ is engaged to cause sun gear $S_1$, sun gear $S_2$ and carrier to rotates as a unit. The third clutch $C_3$ when engaged interconnects sun gear $S_2$ and carrier Ca and includes internal splined section 22a, external splined section 10a and external splined section 18a (see FIGS. 4 and 5B). The third clutch $C_3$ is released when the slide member 12' is in I-position or III-position (see FIGS. 5A and 5C).

When first slide member 12' is in I-position

As shown in FIG. 5A, internal splined section 22a is disengaged from external splined sections 18a and 20a, that is: clutches $C_1$ and $C_3$ are released, and internal splined section 12b is engaged by external splined sections 14 and 20a, that is: clutch $C_2$ is engaged. Brake B, in this condition, is applied (see FIG. 4).

When first slide member 12' is in II-position

As shown in FIG. 5B, internal splined section 22a is still disengaged from external splined section 20a, that is: clutch $C_1$ is released, while internal splined section 22a is now engaged by external splined sections 10a and 18a, that is: clutch $C_3$ is engaged, and internal splined section 12b is engaged by external splined sections 14 and 20a, that is: clutch $C_2$ is engaged. Brake B, in this condition, is released. With the engagement of clutch $C_3$, sun gear $S_2$ is connected to carrier Ca which is connected through clutch $C_2$ to both output shafts $O_1$ and $O_2$, so that the same power path as the first embodiment is provided in this condition.

When first slide member 12' is in III-position

As shown in FIG. 5C, internal splined section 22a is disengaged from external splined section 10a, that is: clutch $C_3$ is released, internal splined section 22a is engaged by external splined sections 18a and 20a, that is: clutch $C_1$ is engaged, and internal splined section 12b is disengaged from external splined section 20a, that is: clutch $C_2$ is released. Brake B is released, in this condition.

It will be noted that the power paths provided by this embodiment is the same as those provided by the first embodiment.

It will also be noted that since the construction of clutch $C_1$ has made it possible to shorten the axial length of the ring member 18', a compact transfer case is provided, that is: a transfer case with less axial length is provided.

Figure 6:
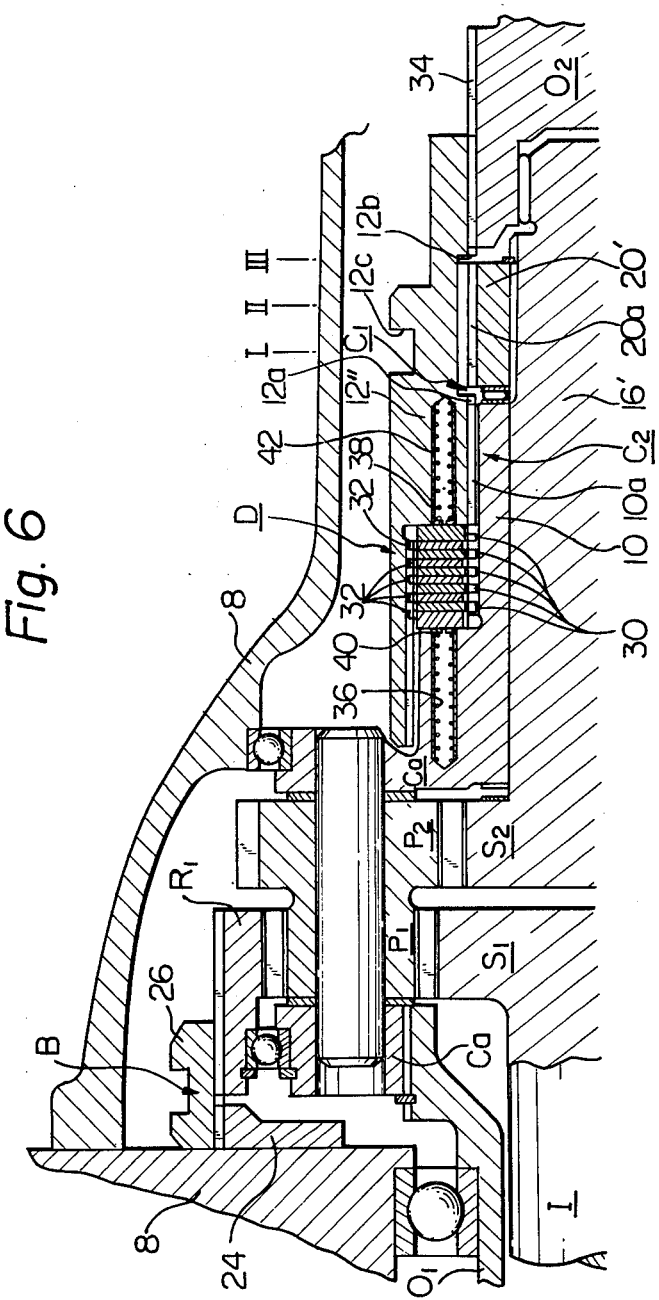
FIG. 6 is a longitudinal section of the upper half of a third embodiment of a transfer case in accordance with the invention.

A third embodiment shown in FIG. 6 differs from the preceding embodiments in that first output shaft $O_1$, which drives a pair of rear wheels, projects from that end of a housing 8 from which an input shaft I extends and second output shaft $O_2$, which drives a pair of front wheels, projects from the opposite end of the housing 8, while, in the preceding embodiments, second output shaft projects from that end of a housing from which an input shaft extends.

In this embodiment, a hollow first output shaft $O_1$ is directly splined to a carrier Ca. The carrier Ca has an annular extension 10 formed with an external splined section 10a, while a second sun gear $S_2$ has a plunger section 16' received within the annular extension 10. The plunger section 16' has splined thereto an annular member 20' formed with an external splined section 20a. The external splined sections 10a and 20a are axially spaced from and adjacent to each other. A first slide member 12" has an internal splined section 12a engaged by the external splined section 10a and another internal splined section 12b engaged by an external splined section 34 formed on the second output shaft $O_2$.

When first slide member 12" is in I-position (position illustrated in FIG. 6), internal splined section 12a is engaged by external splined section 10a and internal splined section 12b engaged by external splined section 34, that is; clutch $C_2$ is engaged, while internal splined section 12a is disengaged from external splined section 20a, that is: clutch $C_1$ is released. In this condition brake B is applied.

When first slide member 12" is in II-position, internal splined section 12b remains engaged by external splined section 34 and internal splined section 12a is engaged by external splined sections 10a and 20a, that is: clutches $C_1$ and $C_2$ are engaged. In this condition brake B is released.

When first slide member 12" is in III-position, internal splined section 12b remains engaged by external splined section 34 and internal splined section 12a is disengaged from external splined section 10a, while it is engaged by external splined section 20a, that is: clutch $C_1$ is engaged and clutch $C_2$ released. In this condition brake B is released.

A differential action limiting mechanism in the form of a clutch D includes a plurality of friction plates 30 splined to annular extension 10 of carrier Ca and interleaved friction plates 32 splined to slide member 12". Suitable griping force tending to urge friction plates 30 against friction plates 32 is developed by means of springs 36 and 38 via rods 40 and 42. Spring force of springs 36 and 38 are such that even when the slide member 12" is in III-position, friction plates 30 frictionally engages friction plates 32 to limit differential action between output shafts $O_1$ and $O_2$.

Figure 7:
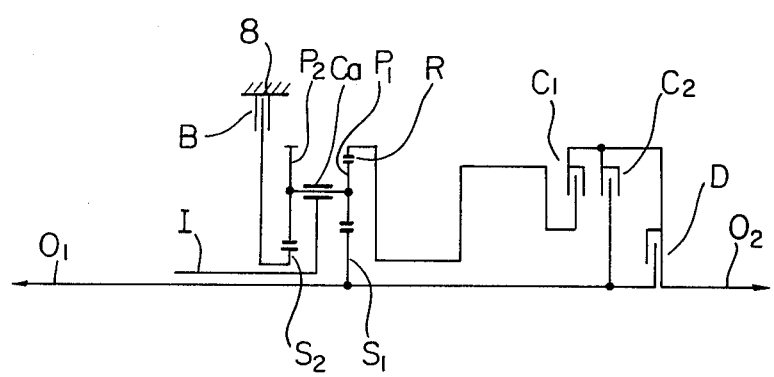
FIG. 7 is a schematic illustration of a fourth embodiment of a transfer case in accordance with the invention.
Figure 8:
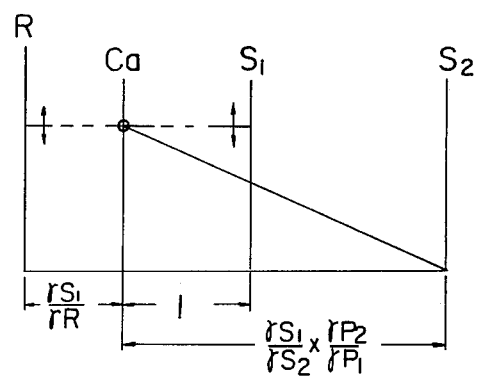
FIG. 8 is a diagram showing the different speed of the different rotary elements of the planetary gear set of the transfer case of FIG. 7.

In the preceding embodiments, a transfer case has, as a first element, a first sun gear $S_1$, as a second element, a carrier $C_a$, as a third element, a second sun gear $S_2$ and as a fourth element, a ring gear $R_1$ ($R_2$), whereas, in the embodiment shown in FIG. 7, a transfer case has, as a first element, a carrier Ca, as a second element, a first sun gear $S_1$, as a third element, a ring gear R and as a fourth element, a second sun gear $S_2$. FIG. 8 shows a speed diagram of the FIG. 7 embodiment.

Figure 9:
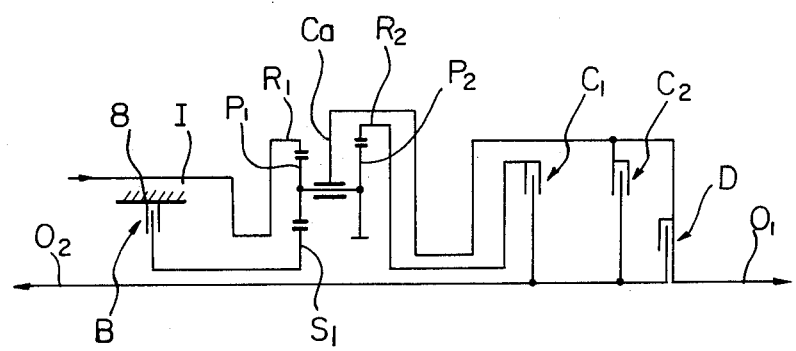
FIG. 9 is a schematic illustration of a fifth embodiment of a transfer case in accordance with the invention.
Figure 10:
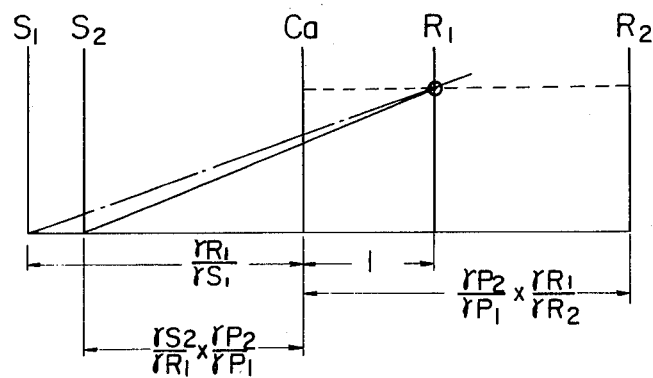
FIG. 10 is a diagram showing the different speeds of the different rotary elements of the planetary gear set of the tranfer case of FIG. 9.

FIG. 9 shows an embodiment in which a transfer case has, as a first element, a ring gear $R_1$, as a second element, a carrier $C_a$, as a third element, a second ring gear $R_2$ and as a fourth element, a first sun gear $S_1$ (or a seconds sun gear $S_2$) and which provides an operation illustrated in a speed diagram shown in FIG. 10. A line and two dots line shows a relation between speeds of the associated elements when the second sun gear $S_2$ replaces the first sun gear $S_1$.

Figure 11:
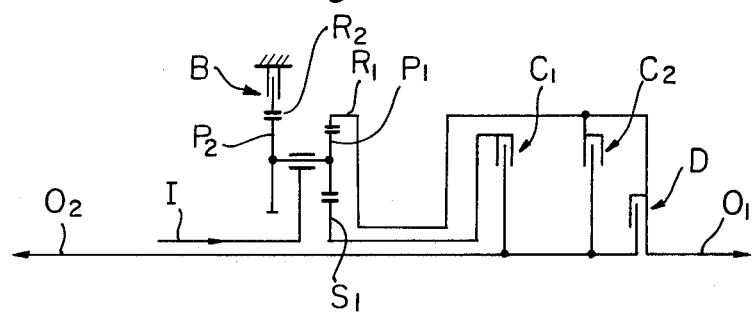
FIG. 11 is a schematic illustration of a sixth embodiment of a transfer case in accordance with the invention.
Figure 12:
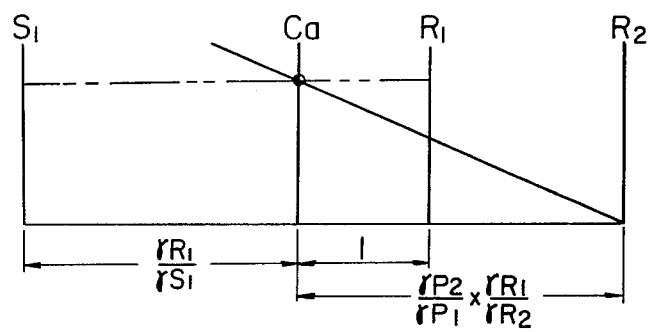
FIG. 12 is a diagram showing the different speeds of the different rotary elements of the planetary gear set of the transfer case of FIG. 11.
Figure 13:
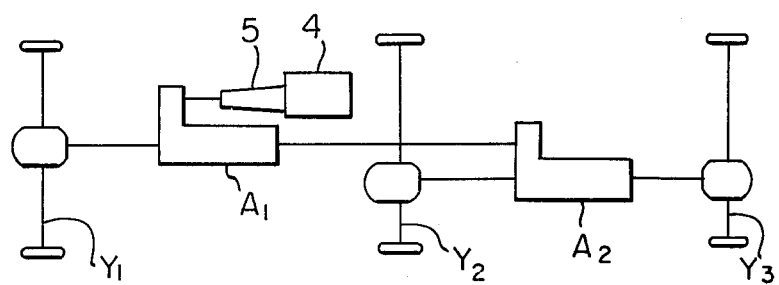
FIG. 13 is a schematic illustration of a six-wheel drive automobile using two transfer cases of the invention.

FIG. 11 shows another embodiment and FIG. 12 its speed diagram. In this embodiments transfer case has, as a first element, a carrier $C_a$, as a second element, a first ring gear $R_1$, as a third element, a sun gear S and as a fourth element, a second ring gear $R_2$.

Where the invention is embodied in an automotive vehicle having more than two axles, such as a vehicle having three axles with six traction wheels, two transfer cases of the invention designated by $A_1$ and $A_2$ are installed as shown in FIG. 13 in such a manner that the first transfer case $A_1$ distributes an output to a first output shaft $Y_1$ and to the second transfer case as an input to the latter, while the transfer case $A_2$ distributes an output to a second coutput shaft $Y_2$ and to a third output shaft $Y_3$.

One feature of the present invention is that a transfer case has an auxiliary function of a gear reduction in addition to its primary function, enabling the instrumentions regarding a multiple drive simple, compact and light in weight. A transfer case of the invention is effortless in manipulation because it can be shifted to any desired condition only with manipulation of one shift lever.

What is claimed is:
1. A transfer case for automotive vehicles comprising:
   an input shaft;
   a first output shaft;
   a second output shaft;
   a planetary gear set including
   a first element connected to said input shaft for synchronous rotation therewith;
   a second element connected to said first output shaft for synchronous rotation therewith;
   a third element;
   a first clutch engageable for interconnecting said third element with said second output shaft;
   a fourth element;
   a brake actuatable for engaging said fourth element with the casing of said transfer case, said brake when actuated to engage said fourth element to said casing inducing a first power transmission path through said first and second elements with said third element permitted to rotate freely, and when not actuated to permit said fourth element to rotate freely establishing a second power transmission path through said first, second and third elements;
   a second clutch engageable for connecting said first and second output shafts; and
   means for selectively engaging and disengaging said brake and said first and second clutches.

2. A transfer case as claimed in claim 1, in which said first element is a first sun gear;
   said second element is a carrier rotatably carrying a first pinion meshing with said first sun gear and a large diameter second pinion integral with said first pinion;

said third element is a second sun gear meshing with said second pinion; and said fourth element is a ring gear meshing with one of said first and second pinions.

3. A transfer case as claimed in claim 1, in which
said first element is a carrier rotatably carrying a first pinion and a large diameter second pinion integral with said first pinion;

said second element is a first sun gear meshing with said first pinion;

said third element is a ring gear meshing with said first pinion; and said fourth element is a second sun gear meshing with said second pinion.

4. A transfer case as claimed in claim 1, in which
said first element is a first ring gear;

said second element is a carrier carrying a first pinion meshing with said first ring gear and a large diameter second pinion;

said third element is a second ring gear meshing with said second pinion; and said fourth element is a sun gear meshing with one of said first and second pinions.

5. A transfer case as claimed in claim 1, in which
said first element is a carrier rotatably carrying said first pinion and a large diameter second pinion integral with said first pinion;

said second element is a first ring gear meshing with said first pinion;

said third element is a sun gear meshing with said first pinion; and said fourth element is a second ring gear meshing with said second pinion.

6. A transfer case as claimed in claim 1, in which
said first clutch means comprises, an external splined section formed on said third element; an external splined section formed on said second output shaft; and a first slide member rotatably carrying an idle spline having an internal splined section, said first slide member being movable into and out of a position in which said internal splined section is engaged by said external splined sections; in which said second clutch means comprises, said external splined section formed on said second output shaft; and an internal splined section formed on said first slide member, said first slide member being connected to said second element for rotation therewith, said first slide member being movable into and out of a position in which said internal splined section thereof is engaged by said external splined section of said second output shaft; and in which said brake means comprises an external splined section formed on said stationary member; an external splined section formed on said fourth element; and a second slide member having an internal splined section, said second slide member being movable into and out of a position in which said internal splined section thereof is engaged by said external splined sections of said stationary member and said fourth element.

7. A transfer case as claimed in claim 1, in which
said first clutch means comprises, an external splined section formed on said third element; and a first slide member having an internal splined section, said first slide member being connected to said second output shaft for rotation therewith and being movable into and out of a position in which said internal splined section is engaged by said external splined section; in which said second clutch means comprises, an external splined section formed on said second element; and said internal splined section of said first slide member, said first slide member being movable into and out of a position in which said internal splined section thereof is engaged by said external splined section of said second element; and in which said brake means comprises an external splined section formed on said stationary member; an external splined section formed on said fourth element; and a second slide member having an internal splined section, said second slide member being movable into and out of a position in which said internal splined section thereof is engaged by said external splined sections of said stationary member and said fourth element.

8. A transfer case as claimed in claim 1, wherein said means takes the form of a single unit slidably received in said casing and which in a first operative position establishes drive connection with speed reduction between said input shaft and said first and second output shafts, in a second operative position establishes drive connection between said input shaft and said first and second output shafts with no speed reduction and in a third operative position establishes drive connection between said input shaft and said first output shaft with no speed reduction.

9. A transfer case as claimed in claim 8, wherein said single unit is slidable via an operative connection with a manually operable lever.

10. A transfer casing as claimed in claim 8, further comprising a limited slip clutch operatively interconnecting said first and second output shafts, said limited slip clutch being responsive to the movement of said single unit in a manner that as said unit moves from said first operative position toward said third operative position the limited slip function of said limited slip clutch progressively decreases.

11. A transfer case as claimed in claim 1, further comprising:
a third clutch engageable for connecting said second and third elements said third clutch being engaged and disengaged by said selectively engaging means.

12. A transfer casing as claimed in claim 1, further comprising a limited slip clutch operatively interconnecting said first and second output shafts.

13. A transfer case for automotive vehicles comprising:
an input shaft;
a first output shaft;
a second output shaft;
a planetary gear set including
a first element connected to said input shaft for rotation therewith;
a second element connected to said first output shaft for rotation therewith;
a third element;
first clutch means for connecting said third element and said second output shaft;
a fourth element
brake means for engaging said fourth element with the casing of said transfer case, said brake means when actuated to engage said fourth element with said casing establishing a first power transmission path through said first and second elements with said third element permitted to rotate freely and when not actuated to permit said fourth element to rotate freely establishes a second power transmission path through said first, second and third elements;

second clutch means for connecting said first and second output shafts;

third clutch means for connecting said third element with said second element; and means for selectively engaging and disengaging said brake means and said first clutch means, said second clutch means and said third clutch means.

14. A transfer case as claimed in claim 13, in which said first element is a first sun gear;
said second element is a carrier rotatably carrying a first pinion meshing with said first sun gear and a large diameter pinion integral with said first pinion;
said third element is a second sun gear meshing with said second pinion; and
said fourth element is a ring gear meshing with one of said first and second pinions.

15. A transfer case as claimed in claim 13, in which said first element is a carrier rotatably carrying a first pinion and a large diameter second pinion integral with said first pinion;
said second element is a first sun gear meshing with said first pinion;
said third element is a ring gear meshing with said first pinion; and
said fourth element is a second sun gear meshing with said second pinion.

16. A transfer case as claimed in claim 13, in which said first element is a first ring gear;
said second element is a carrier rotatably carrying a first pinion meshing with said first ring gear and a large diameter second pinion;
said third element is a second ring gear meshing with said second pinion; and
said fourth element is a sun gear meshing with one of said first and second pinions.

17. A transfer case as claimed in claim 13, in which said first element is a carrier rotatably carrying a first pinion and a large diameter second pinion integral with said first pinion;
said second element is a first ring gear meshing with said first pinion;
said third element is a sun gear meshing with said first pinion; and
said fourth element is a second ring gear meshing with said second pinion.

18. A transfer case as claimed in claim 13, in which said first clutch means comprises, an external splined section formed on said third element; an external splined section formed on said second output shaft; and a first slide member rotatably carrying an idle spline having an internal splined section, said first slide member being connected to said first output shaft for rotation therewith and being movable into and out of a position in which said internal splined section of said idle spline is engaged by said external splined sections of said third element and said second output shaft; in which
said second clutch means comprises, an internal splined section formed on said first slide member, said first slide member being movable into and out of a position in which said internal splined section of said first slide member is engaged by said external splined section of said second output shaft; in which
said third clutch means comprises, an internal splined section formed on said second element, said first slide member being movable into and out of a position in which said internal splined section of said idle spline is engaged by said external splined sections of said third and second elements; and in which
said brake means comprises an external splined section formed on said stationary member; an external splined section formed on said fourth element; and a second slide member having an internal splined section, said second slide member being movable into sand out of a position in which said internal splined section thereof is engaged by said external splined sections of said stationary member and said fourth element.

19. In a vehicle having multiple sets of driven wheels, and an engine having a speed change gear;
a transfer case having an input shaft in drive connection with the output shaft of said speed change gear and first and second output shafts each connected to one of said multiple sets of driven wheels;
a planetary gear set disposed within said transfer case having a first element connected to said input shaft for synchronous rotation therewith;
a second element connected to said first output shaft for synchronous rotation therewith;
a third element;
a first clutch engageable for interconnecting said third element with said second output shaft;
a fourth element;
a brake actuatable for engaging said fourth element with the casing of said transfer case, said brake when actuated to engage said fourth element to said casing inducing a first power transmission path through said first and second elements with said third element permitted to rotate freely, and when not actuated to permit said fourth element to rotate freely establishing a second power transmission path through said first, second and third elements;
a second clutch engageable for connecting said first and second output shafts; and
means disposed with said planetary gear set for selectively engaging and disengaging said brake and first and second clutches to establish a first drive connection between said input shaft and said first and second output shafts, a second drive connection between said input shaft and said first and second output shafts and a third drive connection between said input shaft and said first output shaft, when moved to first, second and third operative positions, respectively.

20. A vehicle as claimed in claim 19, wherein said first drive connection is such that a speed reduction takes place between said input shaft and said first and second output shafts.

21. A vehicle as claimed in claim 19, wherein said second drive connection is such that direct drive takes place between said input shaft and said first and second output shafts.

22. A vehicle as claimed in claim 19, wherein said third drive connection is such that direct drive is established between said first output and said input shaft.

23. A vehicle as claimed in claim 19, further comprising:

a second transfer case the input shaft of which is connected to one of said first and second output shafts of the first transfer case.

24. A vehicle as claimed in claim 19, further comprising a limited slip clutch operatively interconnecting said first and second output shafts.

25. A vehicle as claimed in claim 24, wherein said limited slip clutch is responsive to the movement of said selectively engaging means so that the limited slip function thereof decreases as said selectively engaging means is moved from said first operative position toward said third operative position.

* * * * *